United States Patent [19]

Küsters

[11] Patent Number: 5,189,776
[45] Date of Patent: Mar. 2, 1993

[54] ROLLER

[75] Inventor: Karl-Heinz Küsters, Krefeld, Fed. Rep. of Germany

[73] Assignee: Eduard Küsters Maschinenfabrik GmbH & Co KG, Krefeld, Fed. Rep. of Germany

[21] Appl. No.: 778,941
[22] PCT Filed: Jun. 6, 1990
[86] PCT No.: PCT/DE90/00432
§ 371 Date: Feb. 6, 1992
§ 102(e) Date: Feb. 6, 1992
[87] PCT Pub. No.: WO90/15263
PCT Pub. Date: Dec. 13, 1990

[30] Foreign Application Priority Data

Jun. 10, 1989 [DE] Fed. Rep. of Germany ....... 3918989

[51] Int. Cl.⁵ ............................................. B21B 13/02
[52] U.S. Cl. .................................... 492/7; 100/162 B; 492/5
[58] Field of Search ................. 29/113.1, 113.2, 116.1, 29/116.2; 100/162 B

[56] References Cited

U.S. PATENT DOCUMENTS

| 4,091,517 | 5/1978 | Lehmann et al. | 29/113 |
| 4,149,759 | 4/1979 | Miller | 308/15 |
| 4,299,162 | 11/1981 | Hartmann et al. | 100/43 |
| 4,319,389 | 3/1982 | Marchioro | 29/116 |
| 4,319,390 | 3/1982 | Wolf | 29/116 |
| 4,328,744 | 5/1982 | Pau et al. | 29/116.2 X |
| 4,357,743 | 11/1982 | Hefter et al. | 29/116 |
| 4,726,691 | 2/1988 | Lehmann | 384/99 |
| 4,856,157 | 8/1989 | Holmanstrand | 51/128 |
| 4,941,250 | 7/1990 | Küsters | 29/116 |
| 4,984,343 | 1/1991 | Schörs | 29/116.2 |
| 4,996,862 | 3/1991 | Schrörs | 72/245 |
| 5,033,176 | 7/1991 | Schiel | 29/116.2 |
| 5,044,273 | 9/1991 | Brendel | 100/162 |

FOREIGN PATENT DOCUMENTS

| 0252251 | 1/1988 | European Pat. Off. . |
| 0273185 | 7/1988 | European Pat. Off. . |
| 2849253 | 5/1980 | Fed. Rep. of Germany . |
| 2907761 | 9/1980 | Fed. Rep. of Germany . |
| 2943644 | 5/1981 | Fed. Rep. of Germany . |
| 3026865 | 8/1981 | Fed. Rep. of Germany . |
| 3805323 | 5/1989 | Fed. Rep. of Germany . |
| 3827836 | 10/1989 | Fed. Rep. of Germany . |
| 3843294 | 7/1990 | Fed. Rep. of Germany . |
| 2334002 | 7/1977 | France . |
| 2356045 | 1/1978 | France . |
| 2220047 | 12/1989 | United Kingdom . |

Primary Examiner—Timothy V. Eley
Assistant Examiner—C. Richard Martin
Attorney, Agent, or Firm—Kenyon & Kenyon

[57] ABSTRACT

A roller for compressing of webs of material comprises a rotating hollow roller traversed lengthwise by a stationary crosshead. Hydraulic loading devices in the form of sealing members act on the inside circumference of the hollow roller and delimit hydrostatic bearing pockets to which hydraulic pressure fluid can be supplied. The extension of the sealing members is limited by head bolts, which make it possible to position the hollow roller relative to the crosshead during operation.

4 Claims, 3 Drawing Sheets

ROLLER

BACKGROUND OF THE INVENTION

The invention relates generally to a roller and more particularly to a roller for compressing webs of material.

Such a roller is known from DE-A-29 07 761. There, the sealing members move out during operation and displace the hollow roller relative to the crosshead, until a force equilibrium is achieved. The position which results in this case is indefinite.

However, there is a need for positioning of the sealing members, i.e. of the hollow roller relative to the crosshead, in many cases, for example if a roller is supposed to work in a calander, with a hollow roller freely movable in the plane of effect, radially relative to the crosshead, as the bottom roller. Without positioning, the position of the hollow roller would be dependent only on the forces, and in an extreme case, the bent crosshead could come to rest on the inside circumference of the rotating hollow roller.

Therefore, controls have already been developed for positioning of the hollow rollers which are freely movable in the plane of effect, which act on support elements comparable to the sealing members (DE-B-28 49 253, DE-A-30 26 865), or on external force members which engage on the crosshead (DE-A-29 43 644). In these embodiments, however, the detour of an external regulation is taken, which is connected with a correspondingly reduced response sensitivity and significant additional expenditure.

The reference DE-C-38 05 323 indicates a direct influence on the extension movement, effective by the structure of the individual sealing member. However, this involves a sealing member of a different type, namely a support element with a throttled passage from the cylinder chamber to the bearing pocket. When the extension is too great, the sealing member releases deflection channels, which causes the pressure to collapse. The known support element therefore only serves for the purpose that in an emergency, a limit position is not exceeded from one side. This embodiment is not suitable for positioning purposes, i.e. for maintaining a certain position. This is also true because the pressure is changed when the position influence occurs, which is not allowed to happen for positioning during operation.

The invention is based on the task of allowing positioning of the hollow roller relative to the crosshead, in the plane of effect, in a direct way and without significant additional expenditure.

SUMMARY OF THE INVENTION

This task is accomplished by the invention reproduced in claim 1.

When the stop has been reached, the sealing member is mechanically held in place and cannot move out further. This results in the positioning. However, the pressure fluid passed to the cylinder chamber still reaches the bearing pockets, via the passages, and forms the hydrostatic pressure cushion there. In practice, rollers of the type in question are not controlled only with regard to the line force distribution, but also with regard to the temperature distribution. For reasons of uniform heat transfer to the inside circumference of the hollow roller, the amount flow of the pressure fluid passed to the bearing pockets is therefore very predominantly kept constant. Thus, the same amount of fluid always overflows at the edges of the bearing pockets. If the line force in the roller gap becomes greater, the gap at the edge of the bearing pockets becomes narrower, and the pressure increases, while the amount passing through remains the same. If the line force decreases, the pressure fluid in the bearing pockets is able to raise the hollow roller slightly, which causes the gap at the edge to become greater and allows the pressure fluid to flow off more easily. The pressure in the bearing pockets decreases slightly as a result. Finally, for every condition in the roller gap, a corresponding equilibrium occurs at the edge of the bearing pockets.

At a hydraulic support device of a general type, stops to limit the extension are known from FR-A-23 34 002. However, the hydrostatic bearing pockets of the piston-like sealing members are supplied from throttled feed lines here.

In the preferred embodiment of the invention, the stops are provided only at the sealing members located at the ends, because this is sufficient to maintain a certain position of the hollow roller.

In order to also be able to run a line force distribution which deviates for uniform line force distribution with the roller according to the invention, the structure according to claim 3 is important.

The pressure values which occur in the sealing members located at the ends are given as proportional reference values for the sealing members located between them here. A separate regulator can be assigned to each individual sealing member, but in general, groups of sealing members, for example a middle group and two side groups, will be supplied jointly. Additional reference value portions are applied to these regulators by means of an external reference value transmitter, where these portions, together with the proportional reference value of the sealing members located at the end, result in the total reference value in each case, and thus make it possible to set a desired line force progression which deviates from a uniform value.

DETAILED DESCRIPTION

Figure 1:
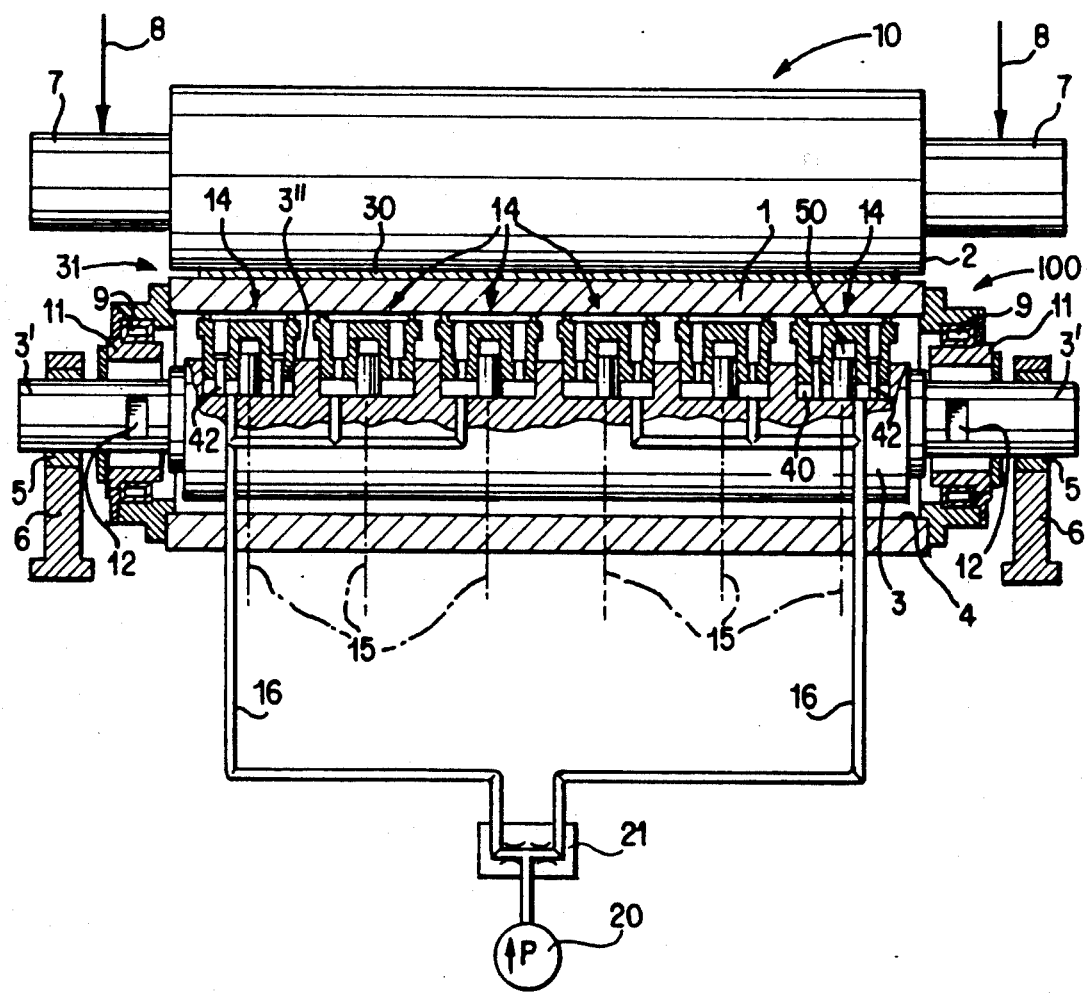
FIG. 1 shows a schematic reproduction of a first embodiment of the invention, in partial cross-section.

The pair of rollers shown in FIG. 1 comprises a top roller 10 and a bottom roller 100, between which a web of material 30 is exposed to compression in the roller gap 31. The top roller 10 is a conventional solid roller. The bottom roller 100, in contrast, comprises a rotating hollow roller 1, the outside circumference 2 of which forms the working roller circumference, traversed lengthwise by a non-rotating crosshead 3, leaving a distance all around to the inside circumference 4 of the hollow roller 1, so that it can move within the hollow roller 1, without coming into contact with the inside circumference 4. The ends 3' of the crosshead 3 which project from the hollow roller 1 are mounted in bearings 5 with universal ball joints, in a roller stand 6 which is only indicated in general. The top roller 10 is stressed by external forces at the roller journals 7; these are applied by force exertion devices symbolized by arrows 8.

The hollow roller 1 can move as a whole, relative to the crosshead 3, in the plane of effect which lies in the plane of the drawing. It is guided in guide rings 11 at its ends, on roller bearings 9; these rings do not rotate, but can move in the plane of effect, on slide surfaces 12 which extend parallel to this plane.

Figure 2:
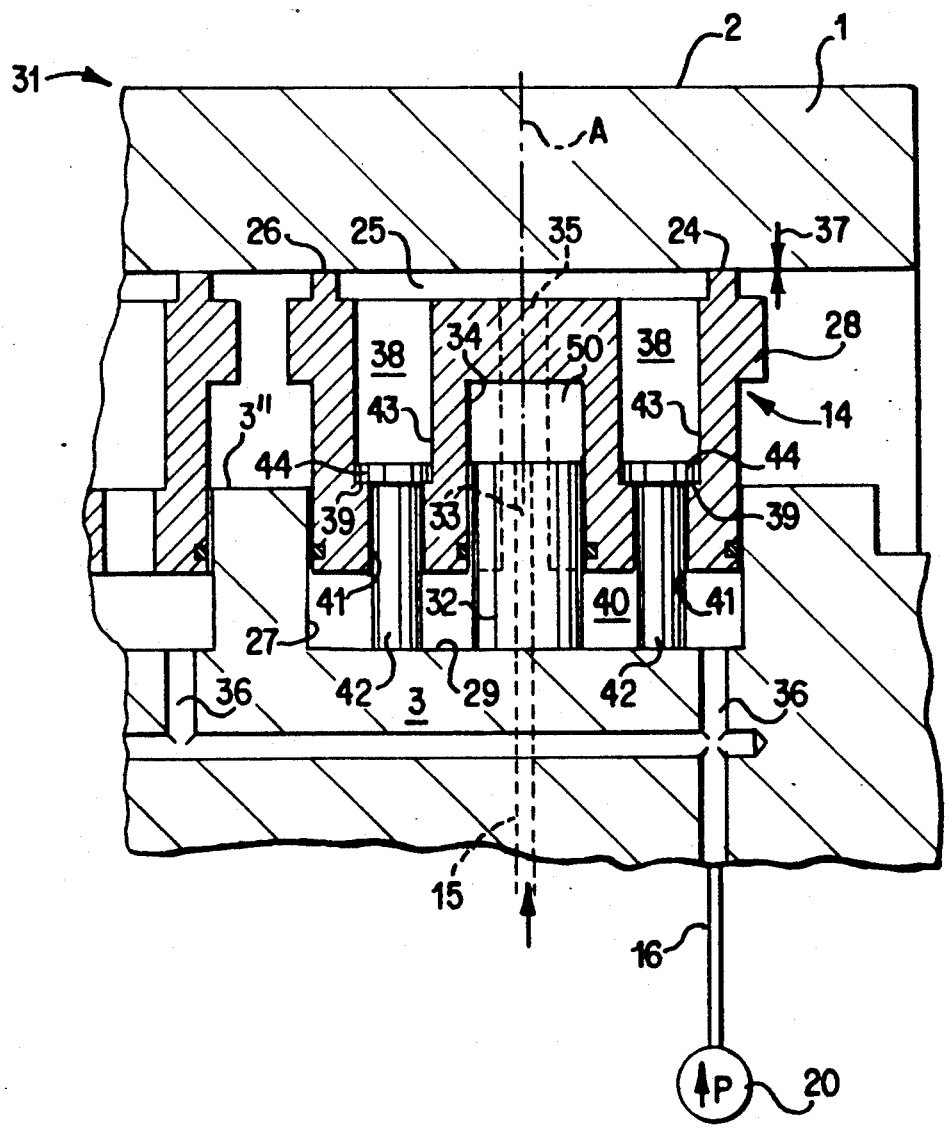
FIG. 2 shows a cross-section through the area of the sealing members.

On the top 3″ of the crosshead 3, facing towards the roller gap 31, several hydraulic loading devices, six in the embodiment shown, are distributed over the length of the hollow roller 1, in the form of sealing members 14, which rest against the inside circumference 4 of the hollow roller 1 with their contact surface 24, which is adapted in shape to the inside circumference 4 of the hollow roller 1 (FIG. 2). Shallow bearing pockets 25 are formed in the contact surface 24, which take up a significant part of the contact surface 24, so that only stays 26 which edge it remain of this surface. In the embodiment, the sealing members 14 have an axis A and are circular in cross-section. They consist of a piston-like cylindrical body 28 which is guided to move within a dead-end cylinder bore 27 at the top 3″ of the crosshead 3, radially to the crosshead 3, which body encloses a cylinder space 40 between its bottom and the base 29 of the dead-end cylinder bore 27. A cylindrical piston 32 is tightly attached on the base 29, coaxial to the dead-end cylinder bore 27, and has a bore 33 passing longitudinally through it, which is connected with a feed line 15 in the crosshead. The piston 32, sealed from above, engages into a dead-end cylinder bore 34, which is passed into the body 28 of the sealing member 14 from below, so that a sealed cylinder chamber 50 is formed above the piston, to which pressure can be applied as selected, via the feed line 15.

The body 28 of the sealing member 14 has throttle-free passages 35, located in front of and behind the plane of the drawing, which produce a connection between the cylinder space 40 below the sealing member 14 and the bearing pocket 15 at its top.

Via branch lines 36, the cylinder space is connected with a feed line 16 in the crosshead 3, through which the pressure fluid is passed from an amount-regulated pump 20, which gives off a uniform amount of pressure fluid per time unit, regardless of the counter-pressure. The pressure fluid enters the cylinder space 40 and passes over into the bearing pockets via the passages 35, from where it flows down towards the outside through the gap 37 between the contact surface 24 and the inside circumference 4 of the hollow roller 1, and forms a bearing liquid film there, which allows the rotating hollow roller to slide past the stationary sealing member 14, without metallic friction, and only with liquid friction.

Pressing the sealing member 14 against the inside circumference 4 of the hollow roller 1 is accomplished by the pressure in the cylinder chamber 50, which determines the force with which the sealing member 14 is pressed against the inside circumference 4 of the hollow roller and with which the gap 37 is held closed. The greater this force, the higher the runoff resistance for the pressure fluid at the gap 37, and the higher the pressure which forms in the bearing pockets 25, if the same amount of pressure fluid is constantly supplied by means of the pump 20. The force exerted against the inside circumference of the hollow roller 1, and therefore the line force in the roller gap 31, depends on the pressure in the bearing pocket 25.

Two step bores 38 are passed through the body 28 of the sealing member 14, in the embodiment; these are narrower in their bottom area and form a step 39. At the base 29 of the dead-end cylinder bore 27, head bolts 42 are attached, for example screwed in, which pass through the narrower bottom part 41 of the step bore 38 with their shaft, and have a radially projecting head 44 at their top end, which has room in the larger top part 43 of the step bore 38. In the position shown in FIG. 2, the head 44 rests against the step 39 and forms a stop against further extension of the sealing member 14 from the top 3″ of the crosshead 3. If the sealing member 14 is moved in further, it can move freely, since play is provided all around on the head bolt 42.

The head bolts 42 determine a clear maximum extension position of the sealing member 14 and thus a clear position of the hollow roller 1 relative to the crosshead 3.

It is sufficient if only the sealing members 14 located at the ends have stops in the form of the head bolts 42. The head bolts 42 are missing in the sealing members 14 located between them.

The amount-regulated pump 20 is only indicated schematically in FIG. 2. In reality, the embodiment corresponds to FIG. 1, where the amount-regulated pump 20 is followed by a flow divider 21, which divides the total flow in half for the feed lines 16 for three sealing members 14 located on the right and three on the left. The feed lines 15 for the cylinder chambers 50 which determine the pressure are connected to a control device, not shown, which makes it possible to exert a force, which can be selected, against the inside circumference 4 of the hollow roller 1, with each sealing member 14.

Figure 3:
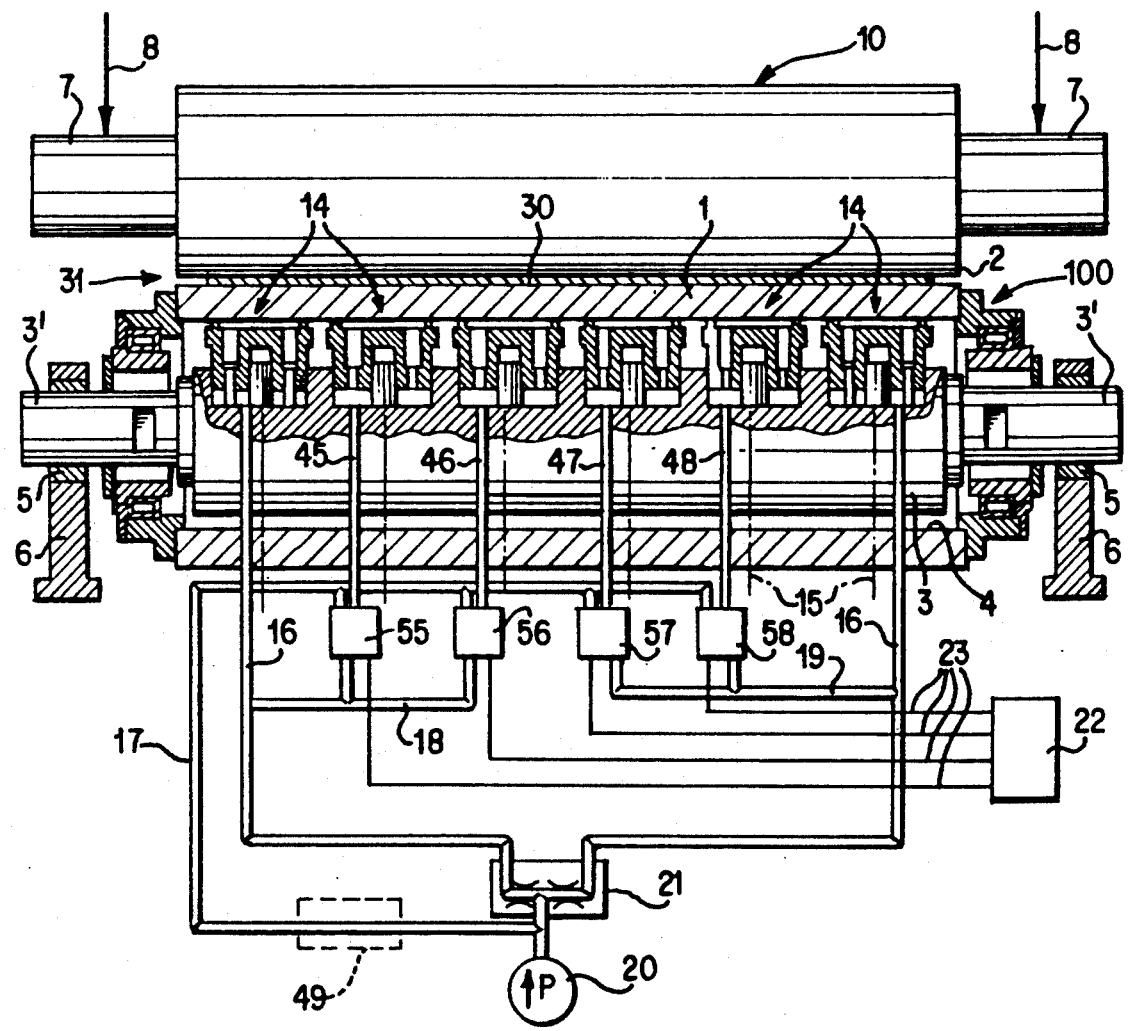
FIG. 3 shows a representation of an embodiment with an expanded control, corresponding to FIG. 1.

In the embodiment according to FIG. 3, the incoming flow of pressure fluid can also be regulated at the middle sealing members 14. The two outer sealing members 14 are supplied in the same manner, via the flow divider 21 and the feed lines 16, as was the case in the embodiment according to FIG. 1. In contrast, however, the inside sealing members 14 are not connected to the same feed line 16, but rather have their own feed lines 45, 46, 47, 48, in which regulators 55, 56, 57 are arranged. The regulators 55, 56, 57 determine how much of the pressure fluid passed in via the line 17 from the pump 20 reaches the lines 45, 46, 47, 48. The pressure of the feed lines 16 of the two sealing members 14 located at the ends is detected via the lines 18, 19 and applied to the regulators as a proportional reference value. In addition, an external reference value transmitter 22 is provided, which delivers the remaining portion of the reference value in each case, via the lines 23.

With the embodiment according to FIG. 3, a more precise profile correction in the roller gap 31 is possible. In particular, a temperature profile can also be adjusted, if the heat exchanger 49, indicated with broken lines, is present.

I claim:

1. A roller for compressing webs of material comprising:
   a rotatable hollow cylinder having an inner circumference, an outer working circumference, and a stationary crosshead extending lengthwise through the hollow cylinder to form a surrounding clearance space with the inner circumference of the hollow cylinder;
   hydraulic support means disposed on the crosshead and acting against the inner circumference of the hollow cylinder for supporting the hollow roller in an active plane, said hydraulic support means comprising a piston-like sealing member radially moveable relative to the crosshead;

a radial cylinder bore disposed in the crosshead in which said sealing member is moveable which forms a cylinder space near the bottom of the bore, said sealing member having a contact surface conforming to the shape of the inner circumference of the hollow cylinder and having a hydrostatic bearing pocket that has an open end facing the inner circumference of the hollow cylinder, said bearing pocket having a closed edge at its periphery that forms said contact surface;

a feed line for conveying hydraulic fluid to the cylinder space;

a passage channel in the sealing member fluidically coupling said cylinder space to the bearing pocket for conveying hydraulic fluid in a throttle-free manner; and means for pressing said sealing member against the inner circumference of the hollow cylinder, said sealing member including a stop for limiting the radial extent said sealing member can travel, said stop having a head bolt that includes a projecting head and a step bore through which said head bolt passes, said step bore having two portions of differing diameter to form an axial step, said head bolt being coupled to a radially inner-most base of the cylinder space, said projecting head being supportable on the step.

2. The roller of claim 1, wherein said hydraulic support means comprises a plurality of piston-like sealing members.

3. The roller of claim 1, wherein said hydraulic support means comprises a first and second sealing member each disposed at an opposite end of said roller and further comprising at least one auxiliary sealing member disposed on the crosshead at a position axially between said first and second sealing members, said at least one auxiliary sealing member being formed without a stop.

4. The roller of claim 3, further comprising auxiliary feed lines for conveying hydraulic fluid to said auxiliary sealing members, said auxiliary sealing members each having a regulator for controlling the quantity of hydraulic fluid being conducted through said auxiliary feed lines, and an external value transmitter coupled to said regulators.

* * * * *